(12) United States Patent
Wan et al.

(10) Patent No.: US 9,214,009 B2
(45) Date of Patent: Dec. 15, 2015

(54) IMAGE REGISTRATION DEVICE AND METHOD, IMAGE SEGMENTATION DEVICE AND METHOD AND MEDICAL IMAGE APPARATUS

(71) Applicants: Kabushiki Kaisha Toshiba, Minato-ku (JP); Toshiba Medical Systems Corporation, Otawara-shi (JP)

(72) Inventors: Jun Wan, Beijing (CN); Yanli Wang, Beijing (CN); Shaobin Wang, Beijing (CN); Atsuko Sugiyama, Otawara (JP)

(73) Assignees: Kabushiki Kaisha Toshiba, Minato-ku (JP); Toshiba Medical Systems Corporation, Otawara-shi (JP)

( * ) Notice: Subject to any disclaimer, the term of this patent is extended or adjusted under 35 U.S.C. 154(b) by 114 days.

(21) Appl. No.: 14/094,905

(22) Filed: Dec. 3, 2013

(65) Prior Publication Data
US 2014/0153797 A1    Jun. 5, 2014

(30) Foreign Application Priority Data
Dec. 4, 2012 (CN) .......................... 2012 1 0514828

(51) Int. Cl.
*G06K 9/00* (2006.01)
*G06T 3/00* (2006.01)
*G06T 7/00* (2006.01)

(52) U.S. Cl.
CPC ............ *G06T 3/0068* (2013.01); *G06T 7/0038* (2013.01); *G06T 2207/10088* (2013.01); *G06T 2207/20016* (2013.01)

(58) Field of Classification Search
CPC .................. G06T 7/0038; G06T 2207/20016; G06T 2207/10088; G06T 3/0068
USPC ......................... 382/128, 173, 294
See application file for complete search history.

(56) References Cited

U.S. PATENT DOCUMENTS

| 2003/0064419 | A1* | 4/2003 | Chandrasiri Herath et al. .............................. 435/7.23 |
| 2010/0054525 | A1* | 3/2010 | Gong ................... G06K 9/6206 382/100 |
| 2011/0103672 | A1* | 5/2011 | Miller .................... A61B 6/501 382/131 |
| 2011/0254980 | A1* | 10/2011 | Perchant .................. G02B 6/06 348/231.99 |
| 2012/0140998 | A1* | 6/2012 | Zhu ......................... G06T 5/006 382/128 |
| 2013/0301897 | A1* | 11/2013 | Zhu ...................... G06K 9/6207 382/132 |
| 2014/0079338 | A1* | 3/2014 | Siewerdsen ........... G06T 3/0068 382/284 |
| 2014/0133727 | A1* | 5/2014 | Oktay ................... G06T 7/0028 382/131 |

FOREIGN PATENT DOCUMENTS

JP            2009-78144        4/2009

* cited by examiner

*Primary Examiner* — Gregory F Cunningham
(74) *Attorney, Agent, or Firm* — Oblon, McClelland, Maier & Neustadt, L.L.P.

(57) ABSTRACT

The present invention provides an image registration device and method, an image segmentation device and method and a medical image apparatus. The image registration device includes: a rigid registration unit for performing a rigid registration of a first input image with a second input image, which is a reference, to obtain first deformation information; a first non-rigid registration unit for performing a first non-rigid registration of the first and second input images by taking the first deformation information as the initial deformation information to obtain second deformation information; and a second non-rigid registration unit for performing a second non-rigid registration of the first and second input images by taking the second deformation information as the initial deformation information to obtain third deformation information. By combining rigid registration with non-rigid registration, the present invention realizes a fast image registration.

17 Claims, 6 Drawing Sheets

IMAGE REGISTRATION DEVICE AND METHOD, IMAGE SEGMENTATION DEVICE AND METHOD AND MEDICAL IMAGE APPARATUS

CROSS-REFERENCE TO RELATED APPLICATIONS

This application is based upon and claims the benefit of priority from Chinese Patent Application No. 201210514828.X, filed on Dec. 4, 2012, the entire contents of which are incorporated herein by reference.

FIELD

The present invention relates to the field of image processing, and more particularly to an image registration device and method, an image segmentation device and method and a medical image apparatus.

BACKGROUND

Image registration and segmentation is an important subject in the filed of image processing and has a broad application prospect. For instance, the image of an imaged object may be registered with a reference image to obtain the information on the relative deformation between the two images. The deformation information is beneficial for a subsequent recognition (e.g. image segmentation) on the imaged object. A registered image can be obtained by superposing the deformation information on the image of the imaged object. The registered image may also be deemed as an image which is obtained by correcting the image of the imaged object by taking a reference image as the reference. A region of interest in the registered image can be determined by segmenting the registered image using the reference image in which the region of interest is labeled.

Accuracy, rapidity and feasibility are several important factors in image registration.

BRIEF DESCRIPTION OF THE DRAWINGS

The present invention will be better understood with reference to the following description taken in conjunction with accompanying drawings in which identical or like reference signs designate identical or like units. The accompanying drawings, together with the detailed description below, are incorporated into and form a part of the specification and serve to illustrate, by way of example, preferred embodiments of the present invention and to explain the principle and advantages of the present invention. In the accompanying drawings.

DETAILED DESCRIPTION

The following presents a simplified summary of the present invention in order to provide a basic understanding of some aspects of the present invention. It should be appreciated that the summary, which is not an exhaustive overview of the present invention, is not intended to identify the key or critical parts of the present invention or limit the scope of the present invention, but merely to present some concepts in a simplified form as a prelude to the more detailed description that is discussed later.

It is an object of the present invention to provide an image registration device and method for realizing a fast image registration. It is another object of the present invention to provide an image segmentation device and method and a medical image apparatus.

According to an aspect of the present invention, an image registration device includes: a rigid registration unit for performing a rigid registration of a first input image with a second input image, which is a reference, to obtain first deformation information; a first non-rigid registration unit for performing a first non-rigid registration of the first and second input images by taking the first deformation information as the initial deformation information to obtain second deformation information; and a second non-rigid registration unit for performing a second non-rigid registration of the first and second input images by taking the second deformation information as the initial deformation information to obtain third deformation information.

According to another aspect of the present invention, an image registration method includes: performing a rigid registration of a first input image with a second input image, which is a reference, to obtain first deformation information; performing a first non-rigid registration of the first and second input images by taking the first deformation information as the initial deformation information to obtain second deformation information; and performing a second non-rigid registration of the first and second input images by taking the second deformation information as the initial deformation information to obtain third deformation information.

According to another aspect of the present invention, an image segmentation device includes: an image registration unit for registering a first input image with a second input image which is a reference, wherein the image registration unit is implemented with the aforementioned image registration device; an image warping unit for superposing the third deformation information obtained by the image registration unit on the first or second input image to generate a registered image; and an image labeling unit for labeling a region of interest on the registered image according to a third input image which is obtained by labeling a predetermined region of interest on the second input image.

According to another aspect of the present invention, an image segmentation method includes: performing a rigid registration of a first input image with a second input image, which is a reference, to obtain first deformation information; performing a first non-rigid registration of the first and second input images by taking the first deformation information as the initial deformation information to obtain second deformation information; performing a second non-rigid registration of the first and second input images by taking the second deformation information as the initial deformation information to obtain third deformation information; superposing the third deformation information on the first or second input image to generate a registered image; and labeling a region of interest on the registered image according to a third input image which is obtained by labeling a predetermined region of interest on the second input image.

According to another aspect of the present invention, a medical image apparatus includes the aforementioned image registration device.

According to another aspect of the present invention, a medical image apparatus includes the aforementioned image segmentation device.

Further, according to another aspect of the present invention, there is provided a computer program for realizing the aforementioned image registration method.

Further, according to another aspect of the present invention, there is provided a computer program product at least in the form of a computer-readable medium, on which computer program codes for realizing the aforementioned image registration method are recorded.

Further, according to still another aspect of the present invention, there is provided a computer program for realizing the aforementioned image segmentation method.

In addition, according to yet another aspect of the present invention, there is provided a computer program product at least in the form of a computer-readable medium, on which computer program codes for realizing the aforementioned image segmentation method are recorded.

In the methods, devices and apparatus disclosed herein, an image registration is performed rapidly by combining rigid registration with non-rigid registration.

Embodiments of the present invention are described below with reference to accompanying drawings. The elements and features described in one of the accompanying drawings or implementation modes of the present invention may be combined with those shown in one or more other accompanying drawings or implementation modes. It should be noted that for the sake of clarity, the representation and description on the units and processing that are irrelative with the present invention but well known by those skilled in this art are omitted.

Image registration can be applied to finding the relative deformation information of an image to be registered and a reference image. Common deformation information is, but not limited to, a deformation field. A deformation field is a vector field capable of reflecting the change between an image to be registered and a corresponding structure (e.g. feature point) in a reference image. The image registration device and method according to embodiments of the present invention are described below with reference to FIG. 1-FIG. 5.

Figure 1:
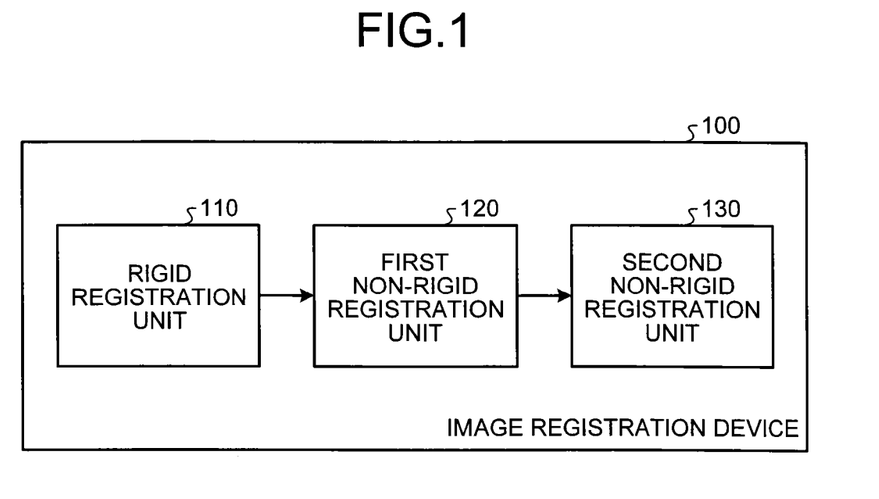
FIG. 1 is a schematic block diagram illustrating an image registration device according to an embodiment of the present invention.

As shown in FIG. 1, in accordance with an embodiment of the present invention, an image registration device 100 includes a rigid registration unit 110, a first non-rigid registration unit 120 and a second non-rigid registration unit 130.

The rigid registration unit 110 performs a rigid registration of a first input image with a second input image, which is a reference, to obtain first deformation information. The first non-rigid registration unit 120 performs a first non-rigid registration of the first and second input images by taking the first deformation information as the initial deformation information to obtain second deformation information. The second non-rigid registration unit 130 performs a second non-rigid registration of the first and second input images by taking the second deformation information as the initial deformation information to obtain third deformation information. The third deformation information may be used as the final registration result of the image registration device 100.

Image registration can be classified, by a spatial transformation relationship, into two major categories, rigid registration and non-rigid registration. Rigid registration aims at the global deformation of an image, such as the rotation, translation and scaling of an entire image, that is, rigid registration is an alignment processing including no local deformation of an image. Non-rigid registration aims at various local deformations of an image, that is, non-rigid registration is an alignment processing which is performed using the local deformation (e.g. local warping) of an image.

In the image registration device 100, the deformation information on a large global deformation between the first and second input images can be obtained after a rigid registration is performed by the rigid registration unit. A plurality of iteration operations need to be performed in non-rigid registration. Performing non-rigid registration by taking the deformation information as the initial deformation information eliminates the influence caused by a large global deformation between images on non-rigid registration, avoiding the problem that too much time is consumed by non-rigid registration due to the large global deformation of the first input image with respect to the second input image while keeping the high accuracy of non-rigid registration. In this way, the image registration device 100 can provides a relatively fast registration speed.

In embodiments of the present invention, the rigid registration unit 110 may use various proper rigid registration methods, including a point-based registration method, a segmentation-based registration method and a voxel features-based registration method. The similarity measurement in a rigid registration may be achieved using a method based on the joint histogram of mutual information and normalized mutual information, or a method based on mean square difference, correlation coefficient or gradient similarity, and the optimization method used in a rigid registration may be the Powell Look-up or the Pseudo-Exhaustive method or other methods that are not listed here.

In embodiments of the present invention, the first non-rigid registration unit 120 and the second non-rigid registration unit 130 may use proper non-rigid registration methods, including a non-rigid registration method of describing a deformation field based on basic functions, a non-rigid registration method based on thin plate spline or B-spline, a non-rigid registration method based on a physical elastic deformation model, a non-rigid registration method based on an optical flow field and the other that are not listed here.

As an example, in an embodiment of the present invention, the first non-rigid registration unit 120 performs the first non-rigid registration using a non-diffeomorphic registration method.

As another example, in an embodiment of the present invention, the second non-rigid registration unit 130 performs the second non-rigid registration using a diffeomorphic registration method to optimize the registration result (that is, the second deformation information) obtained by the first non-rigid registration unit 120 with a relatively high accuracy.

Compared with the diffeomorphic registration method, the non-diffeomorphic registration method is capable of obtaining a larger local deformation between images at the cost of a lower accuracy. When the aforementioned embodiments are combined, performing a diffeomorphic registration by taking large local deformation information as the initial deformation information can eliminate the influence caused by a large local deformation on a diffeomorphic registration, avoiding the problem that a diffeomorphic registration consumes too much time due to the large local deformation of the first input image with respect to the second input image while keeping the high accuracy of a diffeomorphic registration.

In an embodiment, the diffeomorphic registration method used by the second non-rigid registration unit 130 is the Demons (Differomorphic Demons) algorithm, which is high in both accuracy and speed.

In another embodiment, the diffeomorphic registration method used by the second non-rigid registration unit 130 is Large Deformation Diffeomorphic Metric Mapping Algorithm, which is higher in accuracy but lower in speed. However, as the influence caused by a large global deformation in the image is eliminated by the rigid registration unit 110 and the influence caused by a large local deformation in the image is eliminated by the first non-rigid registration unit, even if the second non-rigid registration unit 130 uses the Large Deformation Diffeomorphic Metric Mapping Algorithm, the speed of the image registration is higher than that obtained by using only the Large Deformation Diffeomorphic Metric Mapping Algorithm.

Figure 2:
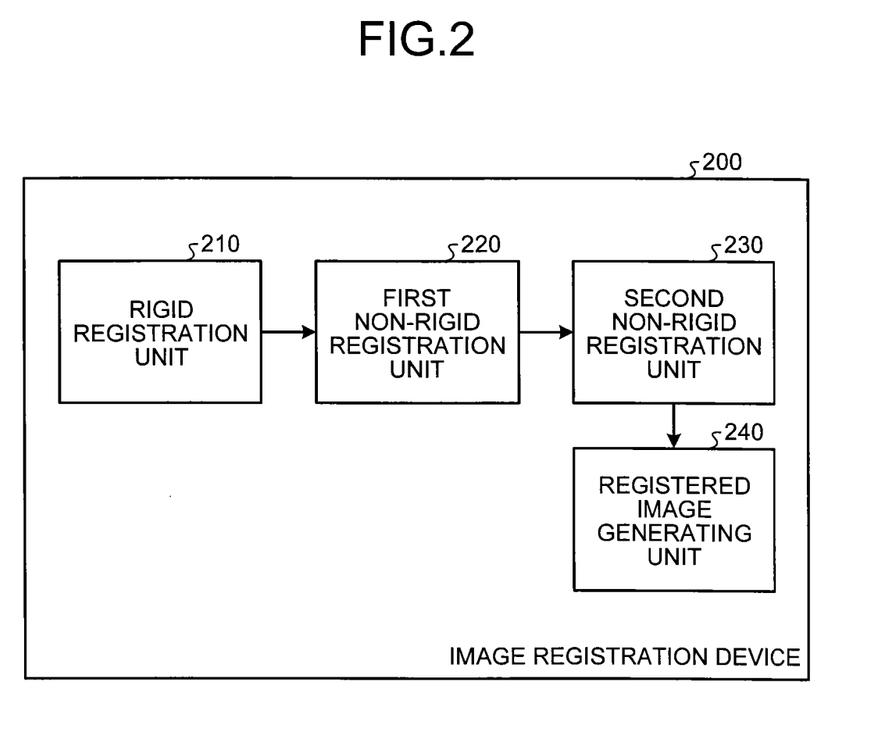
FIG. 2 is a schematic block diagram illustrating an image registration device according to another embodiment of the present invention.
Figure 3:
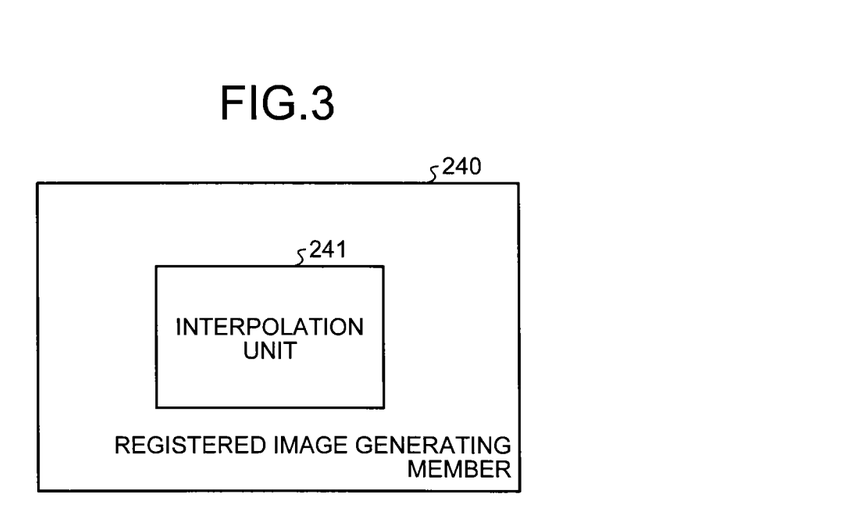
FIG. 3 is a schematic block diagram illustrating a registered image generating unit according to an embodiment of the present invention.

FIG. 2 is a schematic block diagram illustrating an image registration device according to another embodiment of the present invention in which a registered image is generated so that the user can view the registered image conveniently. The registered image may also be deemed as an image which is obtained by correcting the first input image by taking the second input image as the reference.

As shown in FIG. 2, an image registration device 200 includes a rigid registration unit 210, a first non-rigid registration unit 220, a second non-rigid registration unit 230 and a registered image generating unit 240. The rigid registration unit 210, the first non-rigid registration unit 220 and the second non-rigid registration unit 230 are functionally identical to the rigid registration unit 110, the first non-rigid registration unit 120 and the third non-rigid registration unit 130 shown in FIG. 1 and are therefore not repeatedly described herein. The registered image generating unit 240 superposes the third deformation information obtained by the second non-rigid registration unit 130 on the first input image to generate a registered image. Alternatively, the registered image generating unit 240 superposes the third deformation information on the second input image to generate a registered image. The deformation information (e.g. deformation field) is typically in the form of a vector field. Here, each vector in the vector field represents the variation and direction of a corresponding structure (e.g. feature point) in the first and second input images. It should be appreciated that when the vector field represents a change from the first input image to the second input image, the vector field may be superposed on the first input image directly or on the second input image after being reserved so as to obtain a registered image. Similarly, when the vector field represents a change from the second input image to the first input image, the vector field may be superposed on the second input image directly or on the first input image after being reserved so as to obtain a registered image.

In the process of the image registration, as the images stored in a computer are all digital images, the coordinates of pixel points in an image are all represented by integers. When an image is subjected to a spatial transformation (refers here to the superposing of the third deformation information to the first or second input image), the coordinates of the transformed pixel points may not be integers any more, at this time, the image needs to be re-sampled, and in most cases, the re-sampling process is achieved with the use of an image interpolation. Thus, in the embodiment shown in FIG. 3, the registered image generating unit 240 includes an interpolation unit 241. The interpolation unit 241 is for performing interpolation on the first or second input image on which the third deformation information is superposed to change the coordinates of a pixel point of the image to integers (that is, insert a pixel, the coordinates of which are integers, between pixels, the coordinates of which are not integers, after the third deformation information is superposed) prior to the generation of the registered image. The interpolation unit 241 may perform the interpolation operation using various existing proper methods, including the nearest neighbor interpolation method, the bilinear interpolation method, the spline interpolation method and the other interpolation methods that are not listed here.

Figure 4:
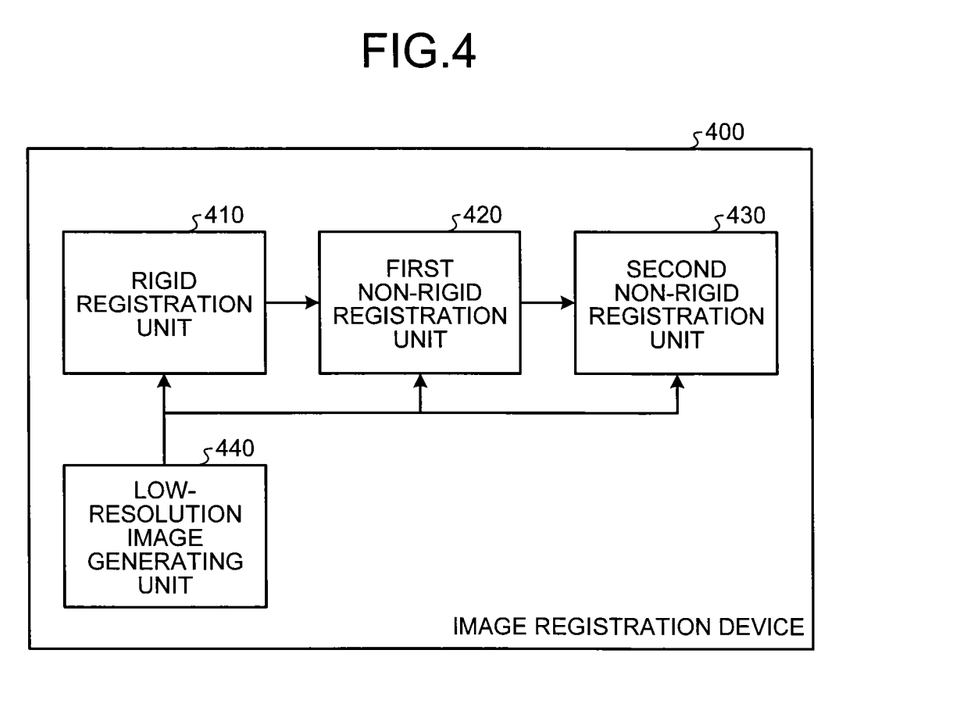
FIG. 4 is a schematic block diagram illustrating an image registration device according to another embodiment of the present invention.

In order to further increase the registration speed of the image registration apparatus 100, in another embodiment of the present invention, two groups of images different in resolution are generated by reducing the resolutions of the first and second input images, respectively, and an image is registered from low resolution to high resolution in a multi-scale manner. FIG. 4 is a schematic block diagram illustrating an image registration device according to the embodiment of the present invention.

As shown in FIG. 4, an image registration device 400 includes a rigid registration unit 410, a first non-rigid registration unit 420, a second non-rigid registration unit 430 and a low-resolution image generating unit 440. The low-resolution image generating unit 440 generates, from the first input images, a group of images different from each other in resolution and forming a pyramid-like structure, and to generate from the second input images, a group of images different from each other in resolution and forming pyramid-like structure. The pyramid structure corresponding to an image includes a group of images which are arranged in the shape of a pyramid and gradually reduced in resolution. The resolution of an original image is reduced at different scales to obtain a group of images. The resolution of the image at the bottom layer of the pyramid of the first input image is equal to or lower than that of the first input image, and the resolution of the image at the top layer of the pyramid of the first input image is lowest. The resolution of the image at the bottom layer of the pyramid of the second input image is equal to or lower than that of the second input image, and the resolution of the image at the top layer of the pyramid of the second input image is lowest. In order to facilitate the registration, the resolution of the image at each layer of the pyramid of the first input image is the same as that of the image at a corresponding layer of the pyramid of the second image. The low-resolution image generating unit 440 may generate the low-resolution images of the first and second input images using any existing proper method such as the Gauss down-sampling method.

The rigid registration unit 410, the first non-rigid registration unit 420 and the second non-rigid registration unit 430 have the functions of the rigid registration unit 110, the first non-rigid registration unit 120 and the third non-rigid registration unit 130 shown in FIG. 1. In addition, in the embodiment shown in FIG. 4, the rigid registration unit 410 performs a rigid registration of each of the images ranging from an image with a predetermined low resolution in the pyramids of the first and second input images to an image with a predetermined high resolution in the pyramids of the first and second input images; the deformation information resulting from a registration is taken as the initial deformation information for the following registration, and the deformation information resulting from the last registration is taken as the first deformation information. The first non-rigid registration unit 420 performs a first non-rigid registration of each of the images ranging from an image with a predetermined low resolution in the pyramids of the first and second input images to an image with a predetermined high resolution in the pyramids of the first and second input images; the deformation information resulting from a registration is taken as the initial deformation information for the following registration, and the deformation information resulting from the last registration is taken as the second deformation information. The second non-rigid registration unit 430 performs a second non-rigid registration of each of the images ranging from an image with a predetermined low resolution in the pyramids of the first and second input images to an image with a predetermined high resolution in the pyramids of the first and second input images; the deformation information resulting from a registration is taken as the initial deformation information for the following registration, and the deformation information resulting from the last registration is taken as the third deformation information.

The resolutions of the image used in the rigid registration, the first non-rigid registration and the second non-rigid registration are independent from each other. In the case where the image resolution available at the end of the rigid registration is different from that available at the beginning of the first non-rigid registration, the first non-rigid registration unit 420 transforms the first deformation information to deformation information having the image resolution available at the beginning of the first non-rigid registration and takes the transformed deformation information as the initial deformation information for the first non-rigid registration. Similarly, in the case where the image resolution available at the end of the first non-rigid registration is different from that available at the beginning of the second non-rigid registration, the second non-rigid registration unit 430 transforms the second deformation information to deformation information having the image resolution available at the beginning of the second non-rigid registration and takes the transformed deformation information as the initial deformation information for the second non-rigid registration.

As a specific example, in the case where the resolution available at the end of a registration process is lower than that available at the beginning of the following registration process, the next registration unit may process the deformation information (e.g. deformation field) resulting from the prior registration process using, for example, an up-sampling method so as to obtain deformation information having the resolution available at the beginning of the following registration process. In the case where the resolution available at the end of a registration process is higher than that available at the beginning of the following registration process, the next registration unit may process the deformation information (e.g. deformation field) resulting from the prior registration process using, for example, a down-sampling method so as to obtain deformation information having the resolution available at the beginning of the following registration process.

The quantity of the information contained in a low-resolution image is lower than that contained of the information contained in a high-resolution image, and accordingly, the low-resolution image is processed at a higher speed than the high-resolution image. The accuracy of an image registration is guaranteed by registering an image with a relatively high resolution according to the result of a registration of an image with a relatively low resolution. Therefore, compared with a method of directly registering an image with the original resolution, the registration method based on multiple resolutions can increase registration speed.

Apparently, it is not necessary that the rigid registration unit 410, the first non-rigid registration unit 420 and the second non-rigid registration unit 430 all use low-resolution images. One or two of the rigid registration unit 410, the first non-rigid registration unit 420 and the second non-rigid registration unit 430 may use low-resolution images, depending on the situation.

In an embodiment of the present invention, the image registration device may further include a pre-processing unit (not shown) which is for performing proper pre-processing on the first image and/or the second input image as demanded. For instance, when applied to registering a brain image, the pre-processing unit may remove a skull part from the first image and/or the second input image and converts the first image and/or the second input image to a gray image/gray images.

Figure 5:
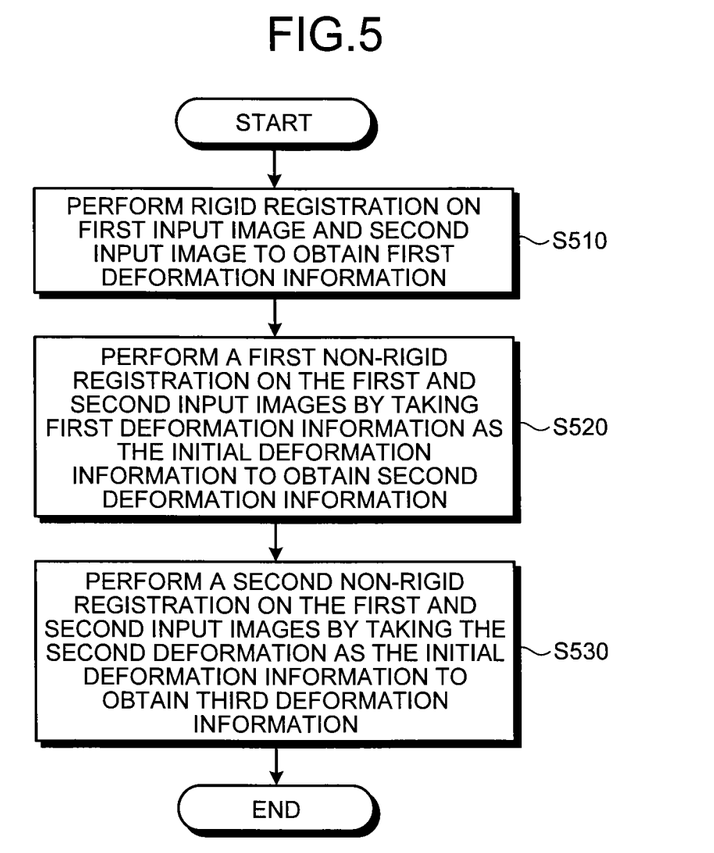
FIG. 5 is a schematic flowchart illustrating an image registration method according to an embodiment of the present invention.

FIG. 5 is a schematic flowchart illustrating an image registration method according to an embodiment of the present invention. As shown in FIG. 5, in Step S510, a rigid registration is performed on a first input image with a second input image, which is a reference, to obtain first deformation information. Step S510 may be performed by the rigid registration unit 110, 210 or 310 arranged in the image registration device described in the aforementioned embodiment. In Step S520, a first non-rigid registration is performed on the first and second input images by taking the first deformation information as the initial deformation information to obtain second deformation information. Step S520 may be performed by the first non-rigid registration unit 120, 220 or 320 arranged in the image registration device described in the aforementioned embodiments. In Step S530, a second non-rigid registration is performed on the first and second input images by taking the second deformation information as the initial deformation information to obtain third deformation information. Step S530 may be performed by the second non-rigid registration unit 130, 230 or 330 arranged in the image registration device described in the aforementioned embodiments. More specific detail of each step of the image registration method and more other possible steps may be understood with reference to the description above on each unit of the image registration device described in the embodiments of the present invention and are therefore not described repeatedly herein.

The image registration device and method according to the aforementioned embodiments may be applied to registering two-dimensional or three-dimensional images, without any limitation.

It should be appreciated that the image registration device and method described herein can be applied to registering all types of images, for example, medical images. In an embodiment, the first input image may be a medical image formed according the data obtained by a medical diagnostic apparatus, and the second input image serving as a reference is a corresponding image selected from a medical atlas, in which the image of a human body is segmented by visceral organs and corresponding data is constructed for each visceral organ and the name of the functional scope of the visceral organ. In another embodiment, the first and second input images may be both medical images formed according to the data obtained by a medical diagnostic apparatus. For instance, the second input image serving as a reference image is a medical image formed according to the data obtained from an examinee representative of a certain region or nation, and the first input image is a medical image formed according to the data formed by another examinee representative of the same region or nation.

The medical image mentioned herein is formed according to the data of an examinee obtained by a medical diagnostic imaging apparatus. Such medical diagnostic imaging apparatuses include, but are not limited to, an X-ray imaging diagnostic apparatus, an ultrasound (UL) diagnostic imaging apparatus, a computed tomography (CT) apparatus, a magnetic resonance imaging (MRI) diagnostic apparatus, a positron emission tomography (PET) apparatus and the like.

Figure 6:
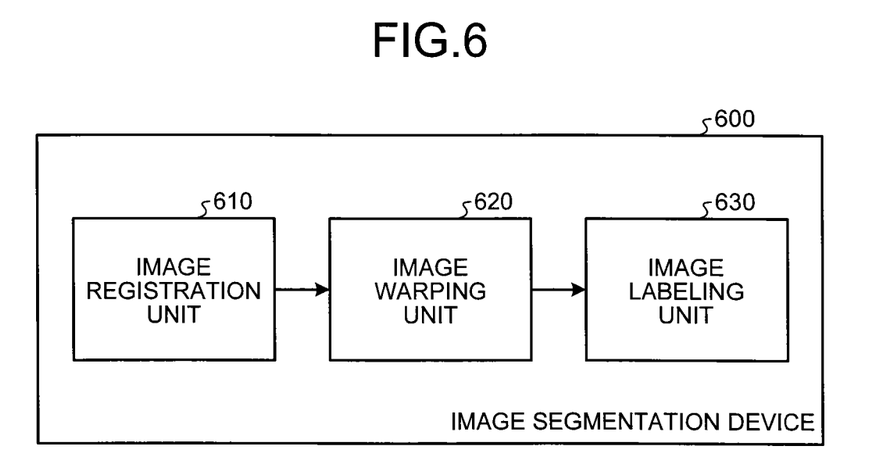
FIG. 6 is a schematic block diagram illustrating an image segmentation device according to an embodiment of the present invention.

The image registration technology according to the embodiments of the present invention may be applicable to registration-based image segmentation. FIG. 6 is a schematic block diagram illustrating an image segmentation device according to an embodiment of the present invention. As shown in FIG. 6, an image segmentation device 600 includes an image registration unit 610, an image warping unit 620 and an image labeling unit 630. The image registration unit 610 is for registering a first input image with a second input image, which is a reference. The image registration unit 610 may be implemented in the image registration device 100, 200 or 300 according to any one of the embodiments above. The image warping unit 620 is for superposing the third deformation information obtained by the image registration unit 610 on the first or second input image to generate a registered image. The image labeling unit 630 is for labeling a region of interest on the registered image according to a label on a region of interest on a third input image. The third input image is obtained by labeling a predetermined region of interest on the second input image. For instance, the third input image is obtained by labeling the name of a visceral organ of interest as well as the name of the functional scope of the visceral organ on the second input image (e.g. a corresponding image selected from a medical atlas).

By implementing the image registration unit 610 using the image registration device disclosed herein, a high registration speed is achieved to provide a fast image segmentation speed.

Figure 7:
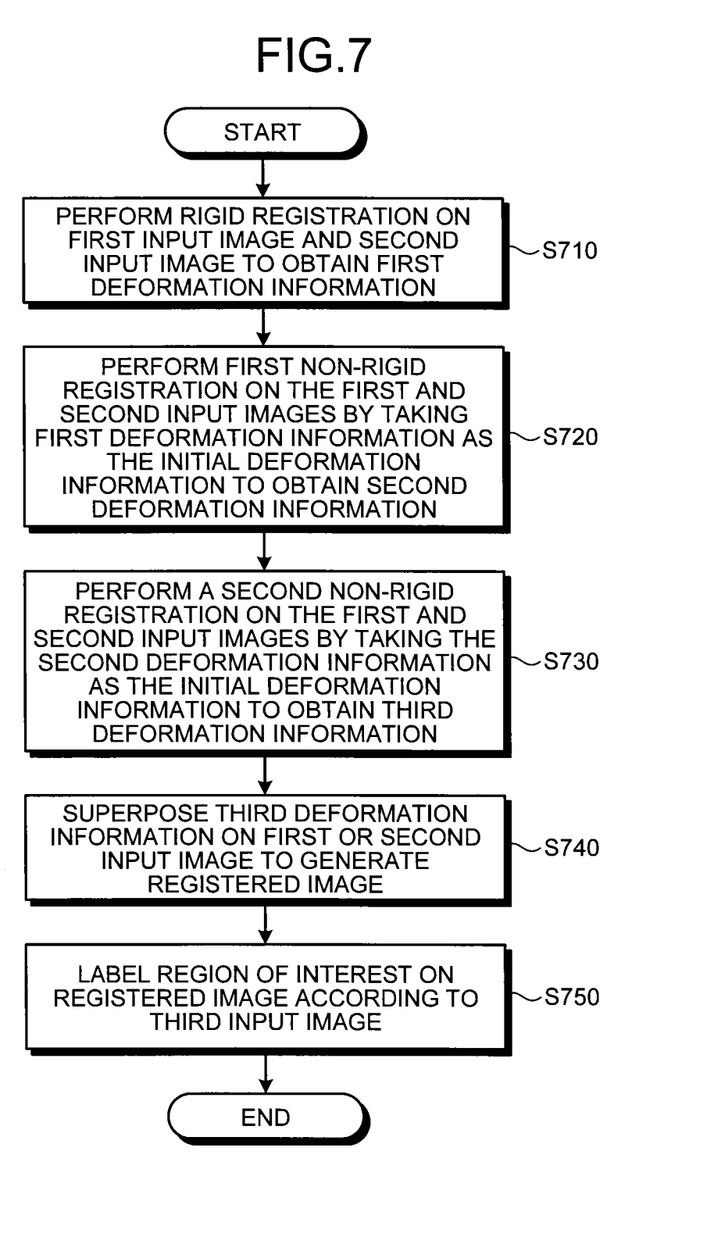
FIG. 7 is a schematic flowchart illustrating an image segmentation method according to an embodiment of the present invention.

FIG. 7 is a schematic flowchart illustrating an image segmentation method according to an embodiment of the present invention. As shown in FIG. 7, in Step S710, a rigid registration is performed on a first input image with a second input image, which is a reference, to obtain first deformation information. In Step S720, a first non-rigid registration is performed on the first and second input images by taking the first deformation information as the initial deformation information to obtain second deformation information. In Step S730, a second non-rigid registration is performed on the first and second input images by taking the second deformation information as the initial deformation information to obtain third deformation information. Steps S710, S720 and S730 may be performed by the image registration unit 610, and more specifically, by the rigid registration unit, the first non-rigid registration unit and the second non-rigid registration unit arranged in the image registration device provided with the image registration unit 610, respectively. Next, in Step S740, the third deformation information is superposed on the first or second input image to generate a registered image. Step S740 may be performed by the image warping unit 620. In Step S750, a region of interest is labeled on the registered image according to a third input image which is obtained by labeling a predetermined region of interest on the second input image. Step S750 may be executed by the image labeling unit 630. More specific detail of each step of the image segmentation method and more other possible steps may be understood with reference to the description above on each unit of the image segmentation device described in the embodiments of the present invention and are therefore not described repeatedly here.

The image segmentation device and method described in the aforementioned embodiments may be applied to segmenting two-dimensional or three-dimensional images, without any limitation.

Similarly, the image segmentation device and method according to the embodiments of the present invention may be applied to segmenting all types of images, for example, medical images. In an embodiment, the first input image may be a medical image formed according to the data obtained by a medical diagnostic apparatus, and the second input image serving as a reference may be a corresponding image selected from a medical atlas. In another embodiment, the first and second input images may be both medical images formed according to the data obtained by a medical diagnostic apparatus.

Figure 8:
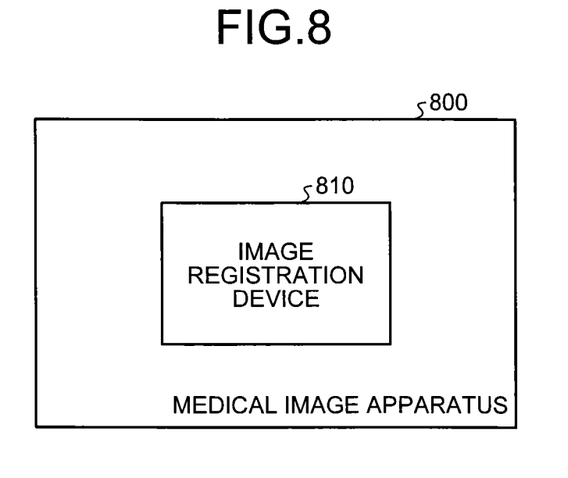
FIG. 8 is a schematic block diagram illustrating a medical image apparatus according to an embodiment of the present invention.

FIG. 8 is a schematic block diagram illustrating a medical image apparatus according to an embodiment of the present invention. In order not to obscure the spirit and scope of the present invention, other possible units of the medical image apparatus are omitted in FIG. 8. The medical image apparatus 800 includes an image registration device 810 which is for registering an input image. The image registration device 810 may be the image registration device 100, 200 or 300 described in any one of the embodiments above. The medical image apparatus 800 may be, but are not limited to, an X-ray imaging diagnostic apparatus, an ultrasound (UL) diagnostic imaging apparatus, a computed tomography (CT) apparatus, a magnetic resonance imaging (MRI) diagnostic apparatus, a positron emission tomography (PET) apparatus and the like.

Figure 9:
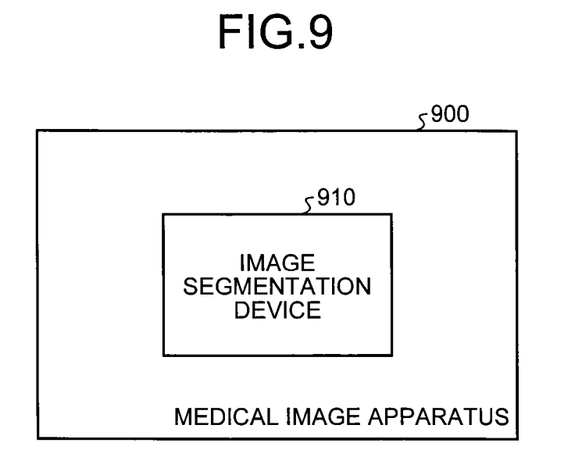
FIG. 9 is a schematic block diagram illustrating a medical image apparatus according to another embodiment of the present invention.

FIG. 9 is a schematic block diagram illustrating a medical image apparatus according to another embodiment of the present invention. In order not to obscure the spirit and scope of the present invention, other possible units of the medical image apparatus are omitted in FIG. 9. The medical image apparatus 900 includes an image segmentation device 910 which is for segmenting an input image. The image segmentation device 910 may be the image segmentation device 600 described in any one of the embodiments above. The medical image apparatus 900 may be, but are not limited to, an X-ray imaging diagnostic apparatus, an ultrasound (UL) diagnostic imaging apparatus, a computed tomography (CT) apparatus, a magnetic resonance imaging (MRI) diagnostic apparatus, a positron emission tomography (PET) apparatus and the like.

The image registration device and the image segmentation device may be installed in a medical image apparatus in a specific way or manner that is well known by those skilled in the art and is therefore not repeatedly described here.

As an example, each step of the aforementioned image registration method and image segmentation method and each module and/or unit of the aforementioned image registration device and image segmentation device may be implemented as software, firmware, hardware or the combination thereof. In the case where the steps or modules and/or units are achieved through software or firmware, a software program for realizing the aforementioned methods is installed in a computer with a dedicated hardware structure (e.g. the general computer 1200 shown in FIG. 10) from a storage medium or network, and the computer, when installed with a program, is capable of realizing the functions of the program.

Figure 10:
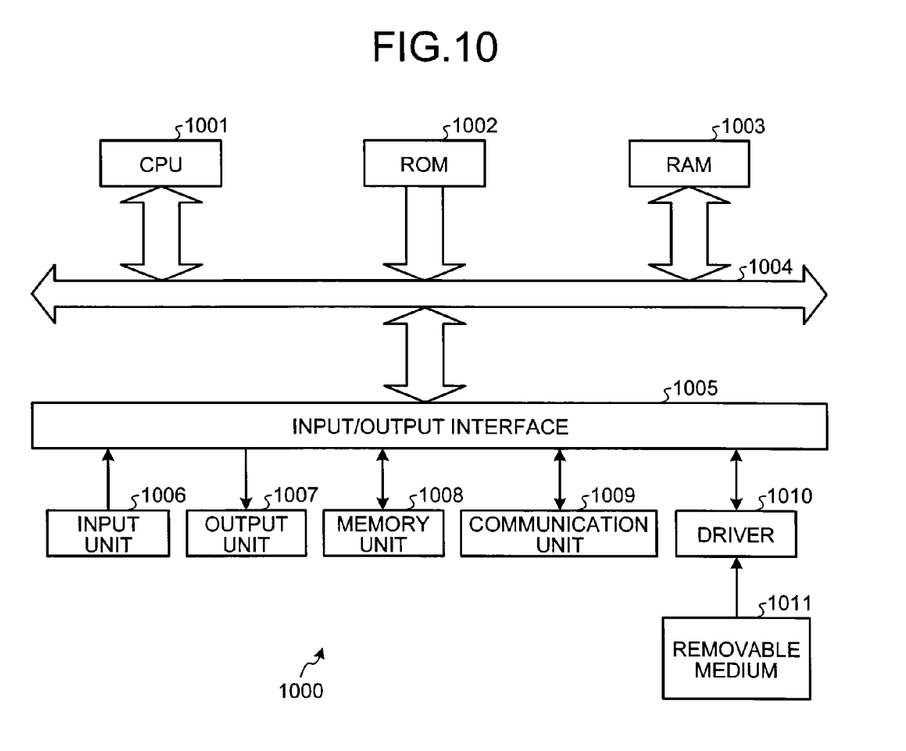
FIG. 10 is an exemplary block diagram illustrating the structure of a computer capable of implementing the embodiments/examples of the present invention.

In FIG. 10, an operation processing unit (namely, CPU) 1001 executes various processing according to a program stored in a read-only memory (ROM) 1002 or a program loaded into a random access memory (RAM) 1003 from a memory unit 1008. The data needed for the various processing of the CPU 1003 may be stored in the RAM 1003 as needed. CPU 1001, ROM 1002 and RAM 1003 are linked with each other via a bus line 1004. An input/output 1005 is also connected with the bus line 1004.

The following units are linked with the input/output interface 1005: an input unit 1006 (including keyboard, mouse and the like), an output unit 1007 (including displays such as cathode ray tube (CRT), liquid crystal display (LCD) and loudspeaker), a memory unit 1008 (including hard disc and the like), and a communication unit 1009 (including a network interface card such as an LAN card and a modem). The communication unit 1009 realizes a communication via a network such as the Internet. A driver 1010 may also be linked with the input/output interface 1005, if needed. A removable medium 1011, for example, a magnetic disc, an optical disc, a magnetic optical disc, a semiconductor memory and the like, may be installed in the driver 1010 as needed to read a computer program therefrom and install the read computer program in the memory unit 1008.

In the case where the foregoing series of processing is achieved through software, programs constituting the software are installed from a network such as the Internet or a storage medium such as the removable medium 1011.

It should be appreciated by those skilled in the art that the storage medium is not limited to the detachable medium 1011 shown in FIG. 10, which is distributed separated from an apparatus so as to provide programs to users, and in which the program is stored. Examples of the removable medium 1011 include magnetic disc (including soft disc (registered trademark)), optical disc (including compact disc read-only memory (CD-ROM) and digital video disk (DVD)), magnetic optical disc (including mini disc (MD) (registered trademark)), and semiconductor memory. Alternatively, the storage medium may be the hard discs included in the ROM 1002 and the memory unit 1008, and programs are stored in the storage medium and are distributed to user along with the storage medium.

The present invention further discloses a program product in which machine-readable instruction codes are stored. The machine-readable instruction codes, when read and executed by a machine, realize the image registration method described herein.

The present invention further discloses a program product in which machine-readable instruction codes are stored. The machine-readable instruction codes, when read and executed by a machine, realize the image segmentation method described herein.

Accordingly, a storage medium for embodying the program product in which computer-readable instruction codes are stored is also covered by the present invention. The storage medium includes but is not limited to soft disc, optical disc, magnetic optical disc, memory card, memory stick and the like.

In the foregoing description on the specific embodiments of the present invention, the features described and/or shown in an implementation mode may be used in one or more other implementation modes in the same or like way or combined with the those of the other implementation modes, or replace those of the other implementation modes.

It should be emphasized that the term "comprise/include", as used herein, means the existence of a feature, element, step or unit in a way not exclusive of the existence or addition of one or more other features, elements, steps or units.

In the aforementioned embodiments and examples, each step and/or unit is represented with a reference sign consisting of figures. It should be understood by those of ordinary skill of the art that the reference signs are merely intended to facilitate description and drawing but are not to be construed as a limitation to order or any other aspect.

Furthermore, the methods provided in the present invention may be performed sequentially, in parallel, or independently in accordance with another time sequence, but not limited to the time sequence described herein. Therefore, the performing orders of the methods described in this specification are not to be construed as a limitation to the scope of the present invention.

Although the present invention has been disclosed with reference to specific embodiments, it should be understood that all the implementation modes and examples described above are merely illustrative of the present invention but are not to be construed as limiting the present invention. Various modifications, improvements or equivalents can be devised by those skilled in the art without departing from the spirit and scope of the present invention, and such modifications, improvements or equivalents should be considered to be within the scope of the present invention.

What is claimed is:

1. An image registration device, comprising:
    a processor configured to:
        perform a rigid registration of a first input image with a second input image, which is a reference, to obtain first deformation information,
        perform a first non-rigid registration of the first input image with the second input image by taking the first deformation information as the initial deformation information to obtain second deformation information,
        perform a second non-rigid registration of the first input image with the second input image by taking the second deformation information as the initial deformation information to obtain third deformation information, and
        generate a registered image by performing a spatial transformation on the first or second input image by using the third deformation information.

2. The image registration device according to claim 1, wherein the processor is configured to perform the first non-rigid registration using a non-diffeomorphic registration method.

3. The image registration device according to claim 1, wherein the processor is configured to perform the second non-rigid registration using a diffeomorphic registration method.

4. The image registration device according to claim 3, wherein the diffeomorphic registration method is the diffeomorphic Demons algorithm.

5. The image registration device according to claim 3, wherein the diffeomorphic registration method is the Large Deformation Diffeomorphic Metric Mapping algorithm.

6. The image registration device according to claim 1, wherein
    the processor is configured to generate, respectively from the first and second input images, a plurality of images different in resolution from each other and forming a pyramid-like structure,
    the resolution of the image at the bottom layer of the pyramid of the first input image is equal to or lower than that of the first input image, and the resolution of the image at the bottom layer of the pyramid of the second input image is equal to or lower than that of the second input image, the resolution of the image at each layer of the pyramid of the first input image is equal to that of the image at a corresponding layer of the pyramid of the second input image, and the processor is configured to perform a plurality of registrations of the images ranging from an image with a predetermined lower resolution in the pyramids of the first and second input images to an image with a predetermined higher resolution in the pyramids of the first and second input images, and the deformation information obtained from a registration is taken as the initial deformation information for the next registration.

7. The image registration device according to claim 6, wherein the processor is further configured to transform, if the image resolution available at the end of the rigid registration is different from that available at the beginning of the first non-rigid registration, the first deformation information to deformation information having the image resolution available at the beginning of the first non-rigid registration and take the transformed deformation information as the initial deformation information for the first non-rigid registration, and/or the processor is further configured to transform, if the image resolution available at the end of the first non-rigid registration is different from that available at the beginning of the second non-rigid registration, the second deformation information to deformation information having the image resolution available at the beginning of the second non-rigid registration and take the transformed deformation information as the initial deformation information for the second non-rigid registration.

8. The image registration device according to claim 1, wherein the processor is configured to perform interpolation on the first or second image, on which the spatial transformation is performed by using the third deformation information, prior to the generation of the registered image.

9. The image registration device according to claim 1, wherein the first input image is a medical image formed according to the data obtained by a medical diagnostic apparatus, and the second input image is a corresponding image selected from a medical atlas.

10. The image registration device according to claim 1, wherein the first and second input images are medical images formed according to the data obtained by a medical diagnostic device.

11. An image segmentation device, comprising:
a processor configured to:
perform a rigid registration of a first input image with a second input image, which is a reference, to obtain first deformation information,
perform a first non-rigid registration of the first input image with the second input image by taking the first deformation information as the initial deformation information to obtain second deformation information,
perform a second non-rigid registration of the first input image with the second input image by taking the second deformation information as the initial deformation information to obtain third deformation information,
generate a registered image by performing a spatial transformation on the first or second input image by using the third deformation information, and
label a region of interest on the registered image by segmenting the registered image according to a third input image which is obtained by labeling a predetermined region of interest on the second input image.

12. The image segmentation device according to claim 11, wherein the first input image is a medical image formed according to the data obtained by a medical diagnostic apparatus, and the second input image is a corresponding image selected from a medical atlas.

13. The image segmentation device according to claim 11, wherein the first and second input images are medical images formed according to the data obtained by a medical diagnostic device.

14. A medical image apparatus comprising the image registration device according to claim 1, wherein
the image registration device includes:
the processor configured to:
perform a rigid registration of a first input image with a second input image, which is a reference, to obtain first deformation information,
perform a first non-rigid registration of the first input image with the second input image by taking the first deformation information as the initial deformation information to obtain second deformation information,
perform a second non-rigid registration of the first input image with the second input image by taking the second deformation information as the initial deformation information to obtain third deformation information, and
generate a registered image by performing a spatial transformation on the first or second input image by using the third deformation information.

15. A medical image apparatus comprising the image segmentation device according to claim 11, wherein
the image segmentation device includes:
the processor configured to:
perform a rigid registration of a first input image with a second input image, which is a reference, to obtain first deformation information,
perform a first non-rigid registration of the first input image with the second input image by taking the first deformation information as the initial deformation information to obtain second deformation information,
perform a second non-rigid registration of the first input image with the second input image by taking the second deformation information as the initial deformation information to obtain third deformation information,
generate a registered image by performing a spatial transformation on the first or second input image by using the third deformation information,
label a region of interest on the registered image by segmenting the registered image according to a third input image which is obtained by labeling a predetermined region of interest on the second input image.

16. An image registration method, comprising:
performing a rigid registration of a first input image with a second input image, which is a reference, to obtain first deformation information;
performing a first non-rigid registration of the first input image with the second input image by taking the first deformation information as the initial deformation information to obtain second deformation information;
performing a second non-rigid registration of the first input image with the second input image by taking the second deformation information as the initial deformation information to obtain third deformation information; and generating a registered image by performing a spatial transformation on the first or second input image by using the third deformation information.

17. An image segmentation method, comprising:

performing a rigid registration of a first input image with a second input image, which is a reference, to obtain first deformation information;

performing a first non-rigid registration of the first input image with the second input image by taking the first deformation information as the initial deformation information to obtain second deformation information;

performing a second non-rigid registration of the first input image with the second input image by taking the second deformation information as the initial deformation information to obtain third deformation information;

generating a registered image by performing a spatial transformation on the first or second input image by using the third deformation information; and labeling a region of interest on the registered image by segmenting the registered image according to a third input image which is obtained by labeling a predetermined region of interest on the second input image.

* * * * *